US010535120B2

(12) United States Patent
Edwards et al.

(10) Patent No.: US 10,535,120 B2
(45) Date of Patent: Jan. 14, 2020

(54) ADVERSARIAL LEARNING OF PRIVACY PROTECTION LAYERS FOR IMAGE RECOGNITION SERVICES

(71) Applicant: International Business Machines Corporation, Armonk, NY (US)

(72) Inventors: Benjamin J. Edwards, Ossining, NY (US); Heqing Huang, Mahwah, NJ (US); Taesung Lee, Ridgefield, CT (US); Ian M. Molloy, Chappaqua, NY (US); Dong Su, Elmsford, NY (US)

(73) Assignee: International Business Machines Corporation, Armonk, NY (US)

( * ) Notice: Subject to any disclaimer, the term of this patent is extended or adjusted under 35 U.S.C. 154(b) by 74 days.

(21) Appl. No.: 15/843,453

(22) Filed: Dec. 15, 2017

(65) Prior Publication Data

US 2019/0188830 A1  Jun. 20, 2019

(51) Int. Cl.
*G06N 3/08* (2006.01)
*G06K 9/00* (2006.01)
*G06K 9/62* (2006.01)
*G06T 5/00* (2006.01)

(52) U.S. Cl.
CPC .......... *G06T 5/002* (2013.01); *G06K 9/00979* (2013.01); *G06K 9/628* (2013.01); *G06K 9/6215* (2013.01); *G06N 3/08* (2013.01); *G06K 2209/27* (2013.01); *G06T 2207/20081* (2013.01); *G06T 2207/30232* (2013.01)

(58) Field of Classification Search
CPC ........... G06T 5/002; G06T 2207/30232; G06T 2207/20081; G06N 3/08; G06K 9/628; G06K 9/6215; G06K 9/00979; G06K 2209/27
See application file for complete search history.

(56) References Cited

U.S. PATENT DOCUMENTS

| 9,721,144 | B2 | 8/2017 | Shuster |
| 2007/0153091 | A1 | 7/2007 | Watlington et al. |
| 2016/0132719 | A1 | 5/2016 | Fithian et al. |
| 2016/0294781 | A1* | 10/2016 | Ninan .................. H04L 63/0407 |

(Continued)

OTHER PUBLICATIONS

Goel, Vaibhava, "IBM advances Watson's image captioning accuracy", International Business Machines Corporation, IBM Cloud Blog available at www.ibm.com/blogs/bluemix/2016/12/watsons-image-captioning-accuracy, Dec. 12, 2016, 8 pages.

(Continued)

*Primary Examiner* — John W Lee
(74) *Attorney, Agent, or Firm* — Stephen J. Walder, Jr.; Jeffrey S. LaBaw

(57) ABSTRACT

Mechanisms are provided to implement an adversarial network framework. Using an adversarial training technique, an image obfuscation engine operating as a generator in the adversarial network framework is trained to determine a privacy protection layer to be applied by the image obfuscation engine to input image data. The image obfuscation engine applies the determined privacy protection layer to an input image captured by an image capture device to generate obfuscated image data. The obfuscated image data is transmitted to a remotely located image recognition service, via at least one data network, for performance of image recognition operations.

19 Claims, 4 Drawing Sheets

(56) References Cited

U.S. PATENT DOCUMENTS

2018/0336463 A1* 11/2018 Bloom ................. G06N 3/0454
2019/0080205 A1* 3/2019 Kaufhold ............. G06K 9/6257

OTHER PUBLICATIONS

He, Kaiming et al., "Deep Residual Learning for Image Recognition", 29th IEEE Conference on Computer Vision and Pattern Recognition (CVPR2016), Jun. 26-Jul. 1, 2016, pp. 1-12. (Version attached: arXiv: 1512.03385v1 [cs.CV]—Dec. 10, 2015).

Newton, Elaine M. et al., "Preserving Privacy by De-Identifying Face Images", IEEE Transactions on Knowledge and Data Engineering, vol. 17, No. 2, Feb. 2005, pp. 232-243.

Osia, Seyed A. et al., "A Hybrid Deep Learning Architecture for Privacy-Preserving Mobile Analytics", Cornell University Library, arXiv: 1703.02952v4 [cs.LG], Apr. 4, 2017, 15 pages.

Szegedy, Christian et al., "Going Deeper with Convolutions", IEEE Conference on Computer Vision and Pattern Recognition(CVPR2015), Jun. 7-12, 2015, pp. 1-9. (Open Access version provided by the Computer Vision Foundation).

* cited by examiner

ADVERSARIAL LEARNING OF PRIVACY PROTECTION LAYERS FOR IMAGE RECOGNITION SERVICES

BACKGROUND

The present application relates generally to an improved data processing apparatus and method and more specifically to mechanisms for performing learning of privacy protection layers for image recognition services.

Computer vision is an interdisciplinary field that deals with how computers can be made for gaining high-level understanding from digital images or videos. From the perspective of engineering, computer vision seeks to automate tasks that the human visual system can do intuitively using specially configured computing devices. Computer vision tasks include methods for acquiring, processing, analyzing and understanding digital images, and extraction of high-dimensional data from the real world in order to produce numerical or symbolic information, e.g., in the forms of decisions. Understanding in this context means the transformation of visual images into descriptions of the world that can interface with other thought processes and elicit appropriate action. This image understanding can be seen as the disentangling of symbolic information from image data using models constructed with the aid of geometry, physics, statistics, and learning theory.

As a scientific discipline, computer vision is concerned with the theory behind artificial systems that extract information from images. The image data can take many forms, such as video sequences, views from multiple cameras, or multi-dimensional data from a medical scanner. As a technological discipline, computer vision seeks to apply its theories and models for the construction of computer vision systems.

Computer vision is used in many applications. For example, computer vision is used in safety systems, such as collision warning systems. Computer vision is also used in various security systems used to monitor residential, business, and industrial environments, traffic monitoring systems, satellite based imaging systems, military systems, and the like.

A generative model is a model for generating all values for a phenomenon, both those that can be observed in the world and "target" variables that can only be computed from those observed. By contrast, discriminative models provide a model only for the target variable(s), generating them by analyzing the observed variables. In simple terms, discriminative models infer outputs based on inputs, while generative models generate both inputs and outputs, typically given some hidden parameters. Generative models are used in machine learning for either modeling data directly (i.e., modeling observations drawn from a probability density function), or as an intermediate step to forming a conditional probability density function. Generative models are typically probabilistic, specifying a joint probability distribution over observation and target (label) values. A conditional distribution can be formed from a generative model through Bayes' rule.

Generative models learn a joint probability distribution p(x, y) of input variables x (the observed data values) and output variables y (determined values). Most unsupervised generative models, such as Boltzmann Machines, Deep Belief Networks, and the like, require complex samplers to train the generative model. However, the recently proposed technique of Generative Adversarial Networks (GANs) repurposes the min/max paradigm from game theory to generate images in an unsupervised manner. The GAN framework comprises a generator and a discriminator, where the generator acts as an adversary and tries to fool the discriminator by producing synthetic images based on a noise input, and the discriminator tries to differentiate synthetic images from true images.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided, in a data processing system comprising at least one processor and at least one memory, the at least one memory comprising instructions which are executed by the at least one processor to configure the at least one processor to implement an adversarial network framework. The method comprises training, by the data processing system, using an adversarial training technique, an image obfuscation engine operating as a generator in the adversarial network framework. The training trains the image obfuscation engine to determine a privacy protection layer to be applied by the image obfuscation engine to input image data. The method further comprises applying, by the image obfuscation engine executing in the data processing system, the determined privacy protection layer to an input image captured by an image capture device associated with the data processing system to generate obfuscated image data. Moreover, the method comprises transmitting, by the data processing system, the obfuscated image data to a remotely located image recognition service, via at least one data network, for performance of image recognition operations.

In other illustrative embodiments, a computer program product comprising a computer usable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE SEVERAL VIEWS OF THE DRAWINGS

The invention, as well as a preferred mode of use and further objectives and advantages thereof, will best be understood by reference to the following detailed description of illustrative embodiments when read in conjunction with the accompanying drawings, wherein.

DETAILED DESCRIPTION

Figure 1:
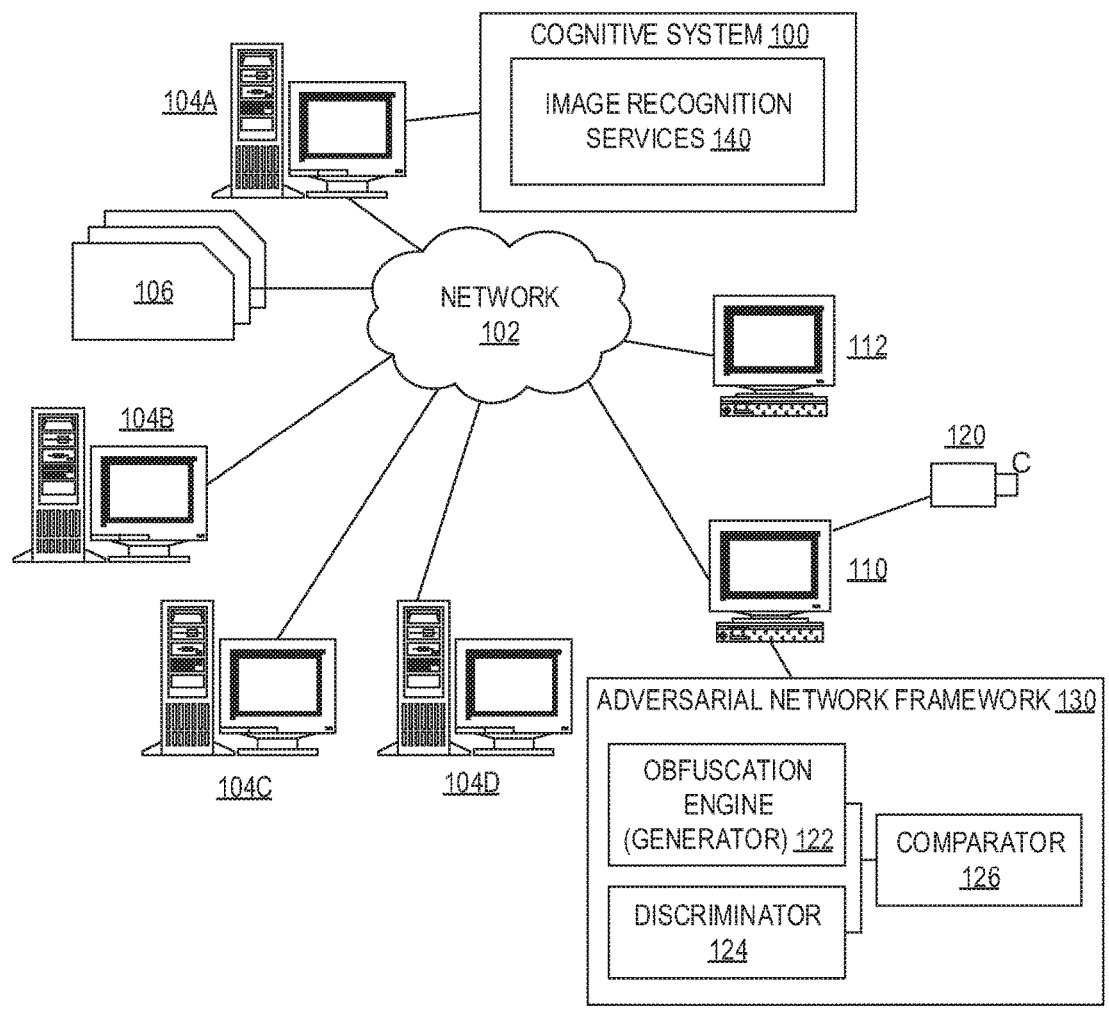
FIG. 1 depicts a schematic diagram of one illustrative embodiment of a cognitive system in a computer network.

The illustrative embodiments provide mechanisms for performing learning of privacy protection layers for image recognition services. As noted above, many systems make use of computer vision. In some cases, deep learning approaches, e.g., convolutional neural networks and the like, have been applied to such computer vision or image/video relevant applications and tasks, e.g., image/event/action recognition, description generation for describing images/video, and the like. For example, in image/video based services, e.g., surveillance cameras, display monitors, recording devices, etc., deep learning mechanisms may be used to perform object identification, motion detection, facial feature recognition, and other image/video attribute analysis and classification operations on captured images/video.

In such cases, users of these services rely on them to identify relevant objects or motions, e.g., identifying guns or other weapons, identifying objects indicative of explosive devices, motions associated with suspicious activity such as stealing goods, breaking into facilities, etc. However, the users, while wanting the services to identify such relevant objects or motions, may not want to reveal the real identity of individuals or entities present within the image/video or otherwise obscure certain aspects of the image/video that may be personally identifiable of the persons or entities, where an entity is any person, organization, place, or the like. For example, the user may employ a surveillance system with computer vision based deep learning to identify stealing motions in images/video, e.g., determining whether or not customers or employees are stealing goods, currency, or the like, from a commercial establishment, but may not want to provide raw images or videos that would divulge the identities of the customers/employees to third parties that provide the deep learning services.

Privacy of the individuals in the images/video is important in the modern day where content on networks, such as the Internet, essentially does not get permanently deleted. Moreover, identification of objects and motions in images/videos may not be as they appear, or as they are classified by automated mechanisms such as deep learning approaches. For example, a motion that appears to be a stealing motion may not in fact be one under the particular circumstances and thus, it is undesirable to make conclusions about the entities depicted in the images/video without further investigation. In other words, it would be undesirable to reveal the identity of an entity in association with an image/video categorized by deep learning services to be a suspicious or criminal activity, as to do so may open up parties to unwanted liability should there be an incorrect conclusion made based on the deep learning service's operation.

Mechanisms may be employed to obfuscate images by applying noise based on ad hoc rules or k-anonymity approaches that preserve the privacy of the entities in the images. However, these mechanisms are limited to situations in which the portions of the image that are to be obfuscated, e.g., faces of persons, are perfectly aligned, which may not be possible when they are obstructed or oriented at different angles from the image capturing device.

The illustrative embodiments provide mechanisms to obfuscate images/video prior to sending the images/video to the deep learning services, or other entity/motion recognition services (collectively referred to as image recognition services), on a remote computing device. A pre-processing operation is performed, e.g., image blurring, on images/videos so that the personally identifiable portions of an image/video, i.e. the portions that may be used to personally identify an entity present in the image/video, are obfuscated or not revealed to the deep learning services but permitting sufficient content of the images/video to be transmitted to the deep learning services to perform the deep learning based operations, e.g., object identification, motion identification, or the like.

The illustrative embodiments utilize an adversarial neural network based learning framework to learn the degree of pre-processing a user's local machine requires to perform on images/video before sending the images/video to the remote computing device to perform the deep learning operations. With the adversarial neural network based learning framework, a generator is provided that is a pre-processor that performs some degree of image blurring or obfuscation and provides the modified image to one or more discriminators. The discriminator of the adversarial neural network may be implemented either as an inverse processor (decoder) or an image recognition processor (discriminator), depending on the particular desired embodiment. In the case of an inverse processor (or decoder), the inverse processor attempts to recreate the non-blurred or non-obfuscated image, i.e. the original image prior to operation by the generator (pre-processor or obfuscation engine). In the case of an image recognition processor, the image recognition processor attempts to identify the particular entity or entities present in the image. The output of the discriminator(s) may be used to compare to the original image and/or its associated labels (which identify the entities present in the image) to determine how well the discriminator(s) performed in recreating the original image and/or identifying the entities, or how poorly the generator performed in blurring or obfuscating the original image. Based on the evaluation of the output of the discriminator(s), operational parameters of the generator are modified to attempt to increase the likelihood that the discriminator(s) will be unable to recreate the original image and/or identify the entity or entities present in the image. The operation may then be repeated with the new generator operational parameters.

It should be appreciated that the training of the adversarial network seeks to achieve the lowest loss, or highest accuracy. The training of the generator, or pre-processor, of the adversarial network seeks to achieve the highest loss, or the lowest accuracy of the adversarial network, while also seeking to obtain the highest accuracy in the output of the deep learning services so as to ensure the utility of the deep learning services. In other words, the generator attempts to blur or obfuscate the original image to avoid personal identification of entities in the image while maintaining sufficient detail in the resulting modified image to allow entity recognition, motion recognition, etc., by the deep learning services, or other recognition services with which the generator operates. In this way, the generator is trained, or learns, the required level or layer of privacy protection needed for protecting the identity of entities present in images while allowing image recognition services to perform their operations.

Before beginning the discussion of the various aspects of the illustrative embodiments in more detail, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on general purpose hardware, software instructions stored on a medium such that the instructions are readily executable by specialized or general purpose hardware, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software, hardware and/or firmware or any combination thereof that performs the specified functions including, but not limited to, any use of a general and/or specialized processor in combination with appropriate software loaded or stored in a machine readable memory and executed by the processor. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As noted above, the present invention provides mechanisms for implementing an adversarial network based framework to train a pre-processor to obfuscate images/video to a sufficient degree to avoid personal identification of entities in images/video while still providing sufficient detail in the images/video to allow image recognition services, e.g., deep learning services, to perform their operations for recognizing objects/motions in the images/video. For purposes of the present description, it should be appreciated that the term "image" as used herein may refer to a single image or a single frame of a series of images, such as in the case of video content. The illustrative embodiments may be applied to single images and/or frames of video content, however for ease of the present description, these will be collectively referred to as "images" herein.

The mechanism of the illustrative embodiments may be utilized with any type of image recognition service and may be used for any desired purpose for performing image recognition in accordance with the particular implementation. For example, various types of object, entity, or activity identification may be used for various types of system implementations and to perform various types of object, entity, or activity identification operations, such as may be provided in security system purposes, self-driving cars, targeted advertisement systems, autonomous construction systems, digital three dimensional reconstruction systems, and the like. Also, the mechanisms of the illustrative embodiments may be applied to other applications with personally identifiable information is present in the input data, such as processing medical records, or the like.

It should be appreciated that the objects and entities that may be obfuscated or blurred by the generator of the adversarial network of the illustrative embodiments may be any type of object or entity, i.e. any type of person, place, or thing that may be identified in an image or frame of video content. The particular obfuscation or blurring operation may be any type of currently known or later developed operation for obfuscation or blurring of images or frames of video content. In some embodiments, based on the training applied to the generator, the generator may select between different types of obfuscation mechanisms based on the discriminator output and output from the image recognition service to achieve a lowest possible loss (highest accuracy) of the adversarial network with the generator (pre-processor) being trained to achieve a highest loss (lowest accuracy) while achieving high accuracy output of the image recognition service.

It should also be appreciated that the illustrative embodiments are described in terms of local pre-processing of images/video content at a local computing device using the generator, or pre-processor, so as to protect privacy of entities present in the images/video content prior to transmission of the images/video content to a remote computing system providing an image recognition service. However, the illustrative embodiments are not limited to such and in fact the pre-processing and image recognition services may be provided on the same computing device or set of computing devices.

Figure 2:
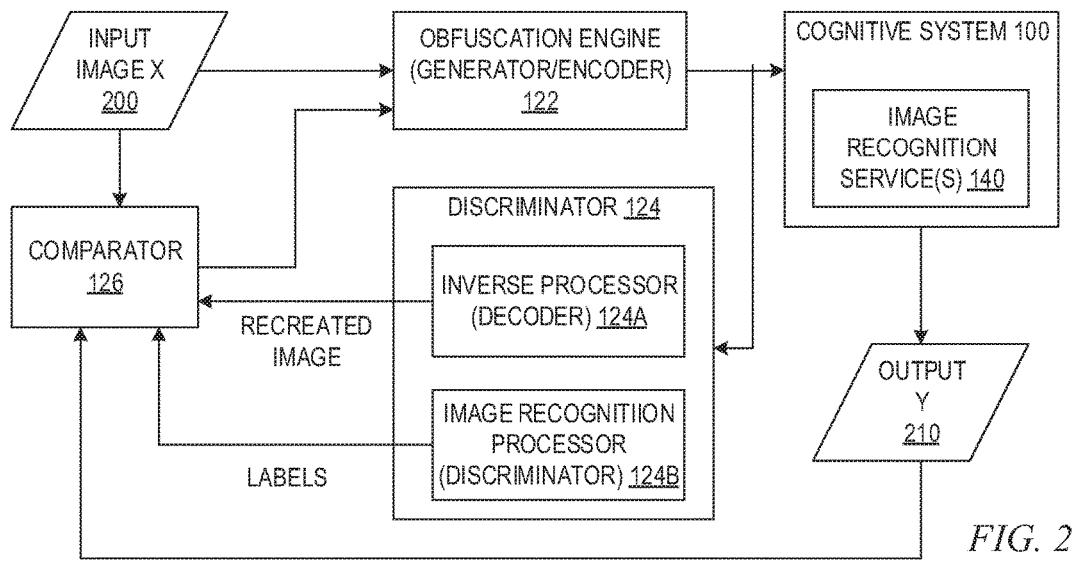
FIG. 2 is an example block diagram outlining the adversarial network based framework and training of the obfuscation engine in accordance with one illustrative embodiment.

Thus, the illustrative embodiments may be utilized in many different types of data processing environments. In order to provide a context for the description of the specific elements and functionality of the illustrative embodiments, FIGS. 1-2 are provided hereafter as example environments in which aspects of the illustrative embodiments may be implemented. It should be appreciated that FIGS. 1-2 are only examples and are not intended to assert or imply any limitation with regard to the environments in which aspects or embodiments of the present invention may be implemented. Many modifications to the depicted environments may be made without departing from the spirit and scope of the present invention.

FIGS. 1-2 are directed to describing a distributed data processing system in which one or more computing devices are specifically configured to provide a cognitive system, e.g., a data processing system that performs deep learning and artificial intelligence based functionality. As an overview, a cognitive system is a specialized computer system, or set of computer systems, configured with hardware and/or software logic (in combination with hardware logic upon which the software executes) to emulate human cognitive functions. These cognitive systems apply human-like characteristics to conveying and manipulating ideas which, when combined with the inherent strengths of digital computing, can solve problems with high accuracy and resilience on a large scale.

A cognitive system performs one or more computer-implemented cognitive operations that approximate a human thought process as well as enable people and machines to interact in a more natural manner so as to extend and magnify human expertise and cognition. A cognitive system comprises artificial intelligence logic and machine learning logic, which may be provided as specialized hardware, software executed on hardware, or any combination of specialized hardware and software executed on hardware. The logic of the cognitive system implements the cognitive operation(s), which in the context of the present invention may include image recognition service operations, such as object or entity identification, activity identification, classification of such objects, entities, or activities, generating alerts based on such identification and classification, sending notifications to other computing devices, logging occurrences of entities and activities identified in images/video content, and the like.

In some illustrative embodiments, the image recognition service operations may be implemented using deep learning networks, such as neural networks, or the like, with which a gradient may be computed given an input. For example, types of neural networks which may be utilized to provide image recognition service operations, or which are similar to neural networks which may be used to provide image recognition services, include those described in Szegedy et all, "Going Deeper with Convolutions," CVPR 2015; He et al., "Deep Residual Learning for Image Recognition," CVPR 2016; and Watson Caption Generator, available from International Business Machines Corporation of Armonk, N.Y. (described at the IBM Cloud Blog available at www.ibm.com/blogs/bluemix/2016/12/watsons-image-captioning-accuracy/). These neural networks take matrices representing red, green, and blue channels of an image to identify primitive shapes and integrate them to discover objects or actions in an image.

In some embodiments, the cognitive system may include one or more neural networks that may be used to perform image recognition services based on an input image or frame of video content. The image or frame may be received from a local or remote computing device. The cognitive system may provide an output that may be used to assist in the training of a generator of an adversarial network based framework of the illustrative embodiments as discussed above and described further hereafter.

FIG. 1 depicts a schematic diagram of one illustrative embodiment of a distributed data processing system in which a cognitive system 100 is implemented. As shown in FIG. 1, the cognitive system 100 is implemented on one or more computing devices 104A-D (comprising one or more processors and one or more memories, and potentially any other computing device elements generally known in the art including buses, storage devices, communication interfaces, and the like) connected to the computer network 102. For purposes of illustration only, FIG. 1 depicts the cognitive system 100 being implemented on computing device 104A only, but as noted above the cognitive system 100 may be distributed across multiple computing devices, such as a plurality of computing devices 104A-D.

The computing devices implementing the cognitive system 100 are specifically configured to implement this cognitive system 100 through execution of appropriate software instructions, providing of particular hardware devices, and the like, that modify the computing device from a generic computing device to a specially configured computing device. In particular, the specially configured computing device comprises an image recognition service cognitive system 100 that is specifically configured to perform image recognition on an input image or frame of video content and output information indicative of the entities/actions identified and classified by the image recognition service cognitive system 100. In some illustrative embodiments, the results of the image recognition may be used to trigger the performance of other cognitive operations by the cognitive system 100 including applying artificial intelligence to determine when to generate alerts, send notifications, log occurrences within a monitored environment, or the like.

The network 102 includes multiple computing devices 104A-D, which may operate as server computing devices, and 110-112 which may operate as client computing devices, in communication with each other and with other devices or components via one or more wired and/or wireless data communication links, where each communication link comprises one or more of wires, routers, switches, transmitters, receivers, or the like. In some illustrative embodiments, the cognitive system 100 and network 102 enables image recognition services functionality for one or more cognitive system users via their respective computing devices 110-112. The computing devices 110-112 may comprise image capturing devices 120 for capturing an image or video content of a monitored environment or other sources of images or video content comprising a sequence of frames. Moreover, as will be described hereafter, the computing devices 110-112 may comprise an obfuscation engine 122 or pre-processor that operates as a generator of an adversarial network based framework 130, and an inverse processor 124A or image recognition processor 124B that operates as a discriminator 124 of the adversarial network based framework 130. Moreover, the computing devices 110-112 may comprise one or more comparators 126 for comparing the outputs of one or more of the discriminators 124A or 124B with the original input image/frame of video content to determine how to train the obfuscation engine/generator 122 to deceive the discriminator 124. Furthermore, the comparator 126 may compare the output of the cognitive system 100 to the input original image metadata to determine an accuracy of the cognitive system 100 operation based on the obfuscated or blurred output image generated by the obfuscation engine/generator 122. Other embodiments of the cognitive system 100 may be used with components, systems, sub-systems, and/or devices other than those that are depicted herein. It should be appreciated that elements 124A and 124B are collectively referred to herein as a discriminator 124, but with the understanding that only one or both of these elements 124A or 124B may be utilized as discriminator 124.

The cognitive system 100 may receive image data or video data (collectively referred to as image data) from a computing device 110, for example, for cognitive processing to thereby identify entities in the image data, identify activities occurring within the image data, or the like. The image data may be captured by the image capture device 120 associated with the computing device 110, e.g., a digital camera, digital video camera, scanner, facial recognition scanner, biometric scanning device, or other type of image capturing device. In some cases, the image capture device 120 may monitor a monitored environment, such as a business location, governmental location, home location, or the like, images of which are captured by the image capture device 120.

The computing device 110 may perform pre-processing on the captured image data prior to transmitting data to the cognitive system 100. The pre-processing on the captured image data operates to obfuscate or blur the personally identifiable portions of the capture image prior to transmission of the modified, i.e. obfuscated, image data to the cognitive system 100. A personally identifiable portion of a captured image is a portion of the image data comprising image data that either alone, or in the context of the remainder of the image data, may be used to personally identify an entity within the captured image data, e.g., may be used to personally identify a person, place, or thing present in the image data. For example, personally identifiable information in an image may be a person's face, a sign with a name on it, an address, a license plate on a vehicle, or any other portion of an image that may be personally identifiable of an entity.

The particular mechanism used to obfuscate or blur the personally identifiable portions of the captured image may take many different forms depending on the particular implementation. One approach is to use the first few layers of the image recognition model, e.g., image recognition service's image recognition model implemented as a convolutional neural network. These first few layers usually consist of convolutional layers, and basically downscale in a way such that the later part of the convolutional neural network can better perform the image recognition. Within the context of the illustrative embodiments, the pre-processing is performed by an obfuscation engine 122 to generate a modified or obfuscated version of the original captured image data which is then transmitted, via the network 102, by the computing device 110 to the cognitive system 100 at the remote server 104A.

The cognitive system 100 provides an image recognition service 140 that operates on the obfuscated image data to perform a cognitive operation, e.g., entity/action identification and classification, alert generation, notification transmission, logging, or the like. It should be appreciated that the entity/action identification, or detection, performed by the cognitive system 100 is not personally identifying the entities in the obfuscated image data, but rather identifying the entities or actions in terms of a more general type or classification such that corresponding cognitive logic may be applied to determine how to respond to the identification and classification of such entities or actions. For example, in a security surveillance based cognitive system, the cognitive system 100 is enlisted by the computing device 110 to recognize portions of modified image data that represent particular types of entities or actions, e.g., a person (entity) stealing (action) a good/currency, a person (entity) concealing a weapon (action), a vehicle (entity) crossing a double white line on the roadway (action), or the like, but without personally identifying the persons involved, places involved, or the like, e.g., the image recognition service 140 determines that a person is present for purposes of performing a cognitive operation, but does not identify the identity of that person.

The cognitive system 100 may output a result, may initiate or trigger an operation, and/or may perform an operation based on the detection and classification of entities or actions present in the modified image data. For example, if the cognitive system 100 determines that a particular entity or action is present in the modified image data, rules may be applied to the identification and classification of the entity or action to cause operations to be performed. In some cases the rules may cause a notification to be sent to a particular computing device or other communication device, e.g., send an instant message to a user's mobile communication device. In some cases, the rules may cause an alert to be generated, e.g., turning on a siren, a warning light, outputting a warning display on a computing terminal, or the like. In other cases, an operation may be initiated on the same or different computing device or system to respond to the identified and classified action performed by the entity, e.g., enabling locks on doors, denying access to particular computing systems or computing system resources, disabling functionality of certain systems, enabling functionality of certain systems, disabling locks on doors, allowing access to particular computing systems or resources, or the like.

In accordance with the illustrative embodiments, the obfuscation engine 122 is trained using an adversarial network based framework. The obfuscation engine 122 may be a neural network that operates as a generator of the adversarial network and operates on an input image based on the weights of nodes in the neural network to modify the input image to obfuscate/blur the original image and thereby generate an obfuscated image data output. During training, the output of the obfuscation engine 122 (generator) is input to a discriminator 124. The discriminator 124 may be implemented, for example, as an inverse processor 124A where the discriminator 124 comprises a neural network that operates as a decoder that attempts to recreate the original input image data from the obfuscated image data. The discriminator 124 may alternatively be implemented as an image recognition processor 124B that approximates the operation of an attacker intercepting image data, in an effort to attempt to identify entities present within the image data. The image recognition processor 124B implementation of the discriminator 124 generates labels for portions of the obfuscated image data indicating what the image recognition processor 124, which may be a neural network, believes those portions represent, i.e. the entities/actions depicted in those portions.

The output of the discriminator 124 is provided to the comparator 126 for comparison to the original image data and/or labels or other metadata associated with the original image data, i.e. the image data prior to obfuscation by the obfuscation engine 122. The comparator 126 may compare the recreated image data, e.g., in the case where the discriminator 124 is implemented as an inverse processor, or the labels generated by the discriminator 124, e.g., in the case that the discriminator 124 is implemented as an image/identity recognition discriminator, to the original image data or labels associated with the original image data. Based on results of the comparison, e.g., a determination of a degree of matching of the discriminator 124 generated output to the original input image data and/or metadata, modifications to the weights and or operational parameters of the obfuscation engine 122 are determined and applied to the obfuscation engine 122 to thereby modify the operation of the obfuscation engine 122 and thus, train the obfuscation engine 122.

The following are examples of possible comparator 126 implementations which may be used with one or more illustrative embodiments. In the case of an image recognition processor 124B that simulates an attacker, the comparator 126 may directly compare the output identity to the actual identity found in the input images using labels. A common measure is cross entropy, and the obfuscation engine 122 may be updated to increase the cross entropy using gradient-based optimization (e.g., stochastic gradient descent, Adam, Adagrad, etc.). In another implementation, a k-anonymity-like measure, that expects at least k similar values in the output class probability vector of the image recognition processor 124B, may be utilized by the comparator 126. In another illustrative embodiment, such as in the case of the inverse processor 124A being used as the discriminator 124, the comparator 126 may use L1, L2, or L-inf norm as a measure and attempt to maximize such norms by updating the obfuscating engine 122.

Thus, the obfuscation performed by the obfuscation engine 122 (generator) is increased or modified when the discriminator 124 is able to recreate the original image data from the obfuscated image data or is able to determine the correct labels for entities in the obfuscated image data. Thus, the accuracy of the obfuscation engine 122 (generator) is decreased on purpose so as to reduce the likelihood that an interloper or the image recognition services provided by the cognitive system 100 themselves are able to discriminate the original image data and/or labels of entities present in the image data.

To offset the tendency of the obfuscation engine 122 to fully obfuscate the original image data and thereby render the operations of the image recognition services of the cognitive system 100 ineffective, the comparator 126 may also receive output from the cognitive system 100 based on the obfuscated image data and may compare the output of the cognitive system 100, with the original image data and/or metadata (e.g., labels) associated with the original image data to determine whether or not the image recognition services of the cognitive system 100 are able to accurately perform their operations on the obfuscated image data generated by the obfuscation engine 122 (generator). The comparator 126 determines a measure of accuracy of the output of the image recognition service of the cognitive system 100 based on how well the output matches a ground truth, labels, or metadata associated with the original image data. For example, the image recognition service may indicate that the obfuscated image data represents a person stealing a good and this determination may be compared to metadata associated with the image which indicates whether or not the image contains a person stealing a good.

If the comparison indicates that the image recognition service is not able to accurately perform its operation on the obfuscated image data, then this may be used to reduce the amount of obfuscation performed by the obfuscation engine 122 by adjusting weights or operational parameters of the obfuscation engine 122 accordingly. This reduction may offset the increase in obfuscation effected by the comparison of the output of the discriminator 124 to the original image data and/or metadata of the original image data as described above such that the competing interests are accommodated. If the comparison indicates that the image recognition service is able to accurate perform its operation on the obfuscated image data, then the obfuscation is dictated by the comparison of the output of the discriminator 124 to the original image and/or metadata of the original image as discussed above.

Thus, the training of the obfuscation engine 122 may be based on both a degree of matching of the output of the discriminator to the input image 200, and a measure of accuracy of the output of the image recognition service to the metadata associated with the input image 200. One way in which these two measures may be combined by the comparator 126 or other training logic to train the obfuscation engine 122 is to use a linear combination of loss functions, as in Loss 1+k*Loss 2, where Loss 1 may be the loss function of the image recognition processor 124B, for example, and Loss 2 may be the loss function of the image recognition services 140, for example. The image recognition neural network may be trained using one loss function, e.g., Loss 1 in this example, which may be a cross-entropy loss. From the second loss function or measure Loss 2, if the optimization goal is maximizing the measure, the domain specific parameter k would be negative; otherwise, k should be positive. This k value is a domain specific parameter whose value is set to control the trade-off between the performance (accuracy of the image recognition service 140) and the privacy (obfuscation performed by the obfuscation engine 122). Optimization methods, such as stochastic gradient descent, Adam, Adagrad, etc. may be applied on the combined loss function Loss=Loss 1+k*Loss 2.

This process may be performed iteratively with the same and or different training images until further improvement in the obfuscation engine 122 operation equal to or above a threshold level of improvement is not able to be achieved, i.e. the training converges. Once trained, the obfuscation engine 122 may be applied to new image data captured by image capture devices 120 associated with the computing device 110 as discussed above to thereby obfuscate the image data prior to transmission to the image recognition service provided by the cognitive system 100.

FIG. 2 is an example block diagram outlining the adversarial network based framework and training of the obfuscation engine in accordance with one illustrative embodiment. As shown in FIG. 2, an input image X 200 is received, such as from an image capture device 120 associated with the local computing device 110 in FIG. 1, for example. The received input image X 200 is input to the obfuscation engine 122, which operates as a pre-processor or generator of the adversarial network based framework. Based on the current settings of the weights of the nodes in the obfuscation engine 122 (e.g., an obfuscation engine configured as a convolutional neural network or the like) or the operational parameters of the obfuscation engine 122, a degree of obfuscation or blurring of the original input image X 200 is determined and applied to generate an obfuscated image output 220. The obfuscated image output 220 is input to the image recognition service cognitive system 100 and the discriminator 124 which may be implemented as an inverse processor 124A, an image recognition processor 124B, or the like.

The discriminator 124 of the adversarial network based architecture attempts to reveal the identity of entities present in the obfuscated image output 220. This is because the obfuscated image output 220 will be sent over the network 102 and the personally identifiable portions of the original image data X 200 need to be obfuscated before the image data leaves the local computing device 110. In one example embodiment, the discriminator 124 is implemented as an inverse processor 124A which tries to reproduce the input image X 200 from the obfuscated image output 220. For example, the inverse processor 124A may be implemented as a deconvolution neural network that inverses the output of the convolutional neural network implemented by the obfuscation engine 122. In another illustrative embodiment, the discriminator 124 is implemented as an image recognition processor 124B which attempts to recognize the identity of an entity in the obfuscated image output 220.

The comparator 126 is used to compare the output of the discriminator 124, e.g., either 124A or 124B for example, to the original image data of the training image X 200 used to train the adversarial network based framework. The comparison provides an indication of the discrepancies between the correct image data, i.e. the original image X 200, and what the discriminator 124 is able to generate from the obfuscated image data 220, e.g., a recreated image or labels for the obfuscated image. If the discrepancy is high, i.e. the discriminator is not able to recreate the original image X 200 in the case of inverse processor 124A to a sufficient degree of accuracy as may be specified by a threshold accuracy value of the like, or the discriminator 124 generates incorrect labels for the entities present in the obfuscated image data 220, i.e. the labels output by the image recognition processor 124B do not match labels in metadata associated with the original training image X 200, then the obfuscation engine 122 has sufficiently obfuscated the original image X 200. However, if the discrepancies are low, then the obfuscation engine 122 has not sufficient obfuscated the original image X 200 and adjustments are made to the weights of nodes in the convolutional neural network implemented in the obfuscation engine, operating parameters of the obfuscation engine, or the like, to thereby increase obfuscation by the obfuscation engine 122.

In addition, the image recognition service cognitive system 100 operates on the obfuscated image data 220 to perform entity/action identification and provides an output Y 210 that is fed back into the comparator 126. The comparator 126 compares the output Y 210 to the metadata or labels associated with the input training image X to determine if the image recognition service cognitive system 100 was able to perform its operations with a sufficiently high level of accuracy, again which may be specified by a threshold accuracy value, based on the obfuscated image data 220. If the output Y 210 has a relatively high discrepancy from the entity/action identification information associated with the original training image X data 200, then it is indicative that the obfuscation performed by the obfuscation engine 122 is rendering the image recognition services ineffectual and the obfuscation should be scaled back. Thus, appropriate modifications to weights and/or operational parameters of the obfuscation engine 122 (generator of the adversarial network) to reduce obfuscation may be performed. In this way, the competing interests of providing obfuscation of personally identifiable portions of input images with the ability to perform entity/action identification and classification are accommodated in the training of the obfuscation engine 122.

The adversarial network based framework or architecture shown in FIG. 2 is trained to achieve the lowest loss, or highest accuracy, with the obfuscation engine 122 being trained to achieve the highest loss, or lowest accuracy of the adversarial network. The adversarial network based framework or architecture shown in FIG. 2 is also trained to achieve a high accuracy output Y 210 from the image recognition services cognitive system 100 so as to ensure the utility of the image recognition services. The loss function can be either difference based on matrix norm, or other privacy measures such as k-anonymity, e.g., different entities are pre-processed by the obfuscation engine 122 to the same output, or top-k items of the output.

As noted previously, in addition to, or alternative to, the modification of operational parameters and/or weights associated with the obfuscation engine 122, in some illustrative embodiments, the training may comprise selection of different types of obfuscation performed by the obfuscation engine 122, where again the goal is to achieve a highest accuracy of the image recognition services 140 while achieving a lowest accuracy of the obfuscation engine 122. That is, there may be many different obfuscation techniques that may be implemented by the obfuscation engine 122 and the obfuscation engine 122 may apply those to the input image to generate different types of obfuscated images that are processed in the manner previously described above to generate different levels of achievable accuracy in the obfuscation engine 122 and the image recognition services 140. The training may identify the achievable accuracies for each of these different obfuscation techniques and a technique that achieves a desired level (e.g., as may be determined from predetermined thresholds or the like) of accuracy in the obfuscation engine 122 (lowest accuracy) and the image recognition service 140 (highest accuracy), respectively, may be selected given the tradeoff between these.

Figure 3:
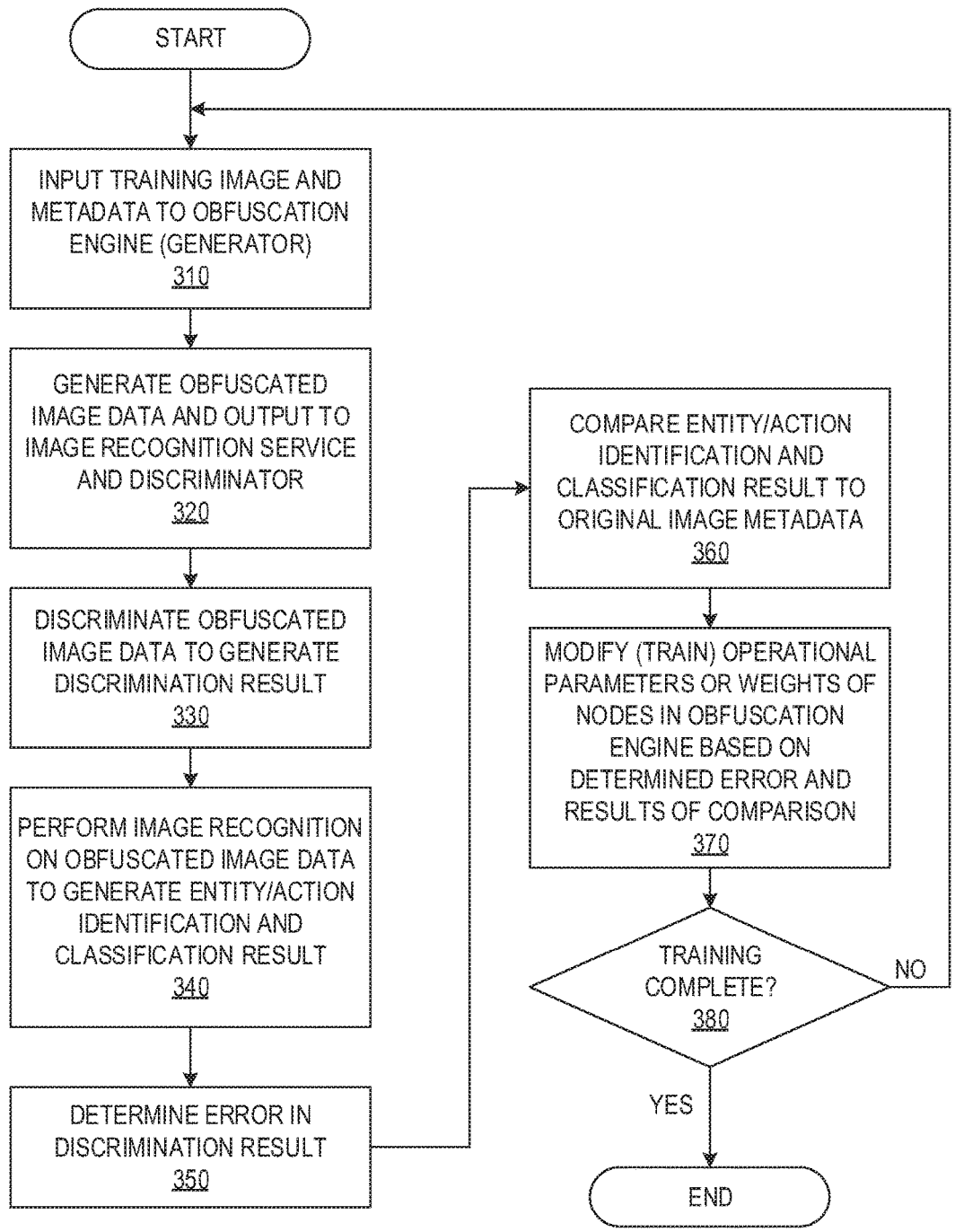
FIG. 3 is a flowchart outlining an example operation for training an obfuscation engine in accordance with one illustrative embodiment.

FIG. 3 is a flowchart outlining an example operation for training an obfuscation engine in accordance with one illustrative embodiment. As shown in FIG. 3, the operation starts by inputting a training image and its corresponding metadata to the obfuscation engine (pre-processor), i.e. the generator of the adversarial network based framework (step 310). The obfuscation engine generates obfuscated image data in which personally identifiable portions of the training image are obfuscated. The obfuscated image data is then output to the image recognition service and discriminator of the adversarial network based framework (step 320).

The discriminator discriminates the obfuscated image data to generate a discrimination result (step 330). As noted above, this discrimination result may be a result based on an attempt by the discriminator to recreate the original training image based on the obfuscated image data, such as in the case of the discriminator being implemented as an inverse processor. In some embodiments, the discrimination result may be labels identifying entities present in the obfuscated image data which may then be used to compare to metadata associated with the training image, such as in the case where the discriminator is implemented as an image recognition processor.

The image recognition service operates on the obfuscated image data to generate entity/action identification and classification results by performing image recognition to identify and classify any entities and or indications of motions or actions for which the image recognition service is employed (step 340). An error in the discrimination result is then determined (step 350). This discrimination result error may be determined in various ways depending on the particular implementation of the discriminator. For example, if the discriminator is implemented as an inverse processor or decoder, such as inverse processor (decoder) 124A in FIG. 2, then the discrimination error may be determined based on a comparison of a recreated image generated by the inverse processor from the obfuscated image generated by the obfuscation engine, to the original input image. If the discriminator is implemented as an image recognition processor, such as 124B in FIG. 2, then the discrimination result error may be determined based on errors in labels generated by the image recognition processor. In either case, the discrimination result error may identify a degree of matching of the output generated by the discriminator to the correct result.

In addition, the entity/action identification and classification result is compared to the original training image metadata which may comprise labels or other metadata specifying what entities/actions are present in the training image (step 360). This comparison results in a measure of accuracy of the image recognition service that generated the entity/action identification and classification result.

Based on the discrimination error and the results of the comparison, the operational parameters or weights of nodes in the obfuscation engine are modified, and thus, the obfuscation engine (generator) is trained (step 370). This training may evaluate the competing interests of increasing obfuscation of personally identifiable portions of the input image while maintaining sufficient content in the obfuscated images to allow the image recognition services to perform their operations with high accuracy.

A determination is made as to whether the training of the obfuscation engine has been completed (step 380). There are several ways in which this determination may be made. One way is using convergence of a loss function, i.e. determining a point at which the loss does not decrease well and changes slowly, although any other known or later developed methodology for determining when the training of a deep learning network is complete may be used without departing from the spirit and scope of the illustrative embodiments. If the training is not complete, then the operation returns to step 310 with continued training on another training image. If training is complete, the operation terminates.

Figure 4:
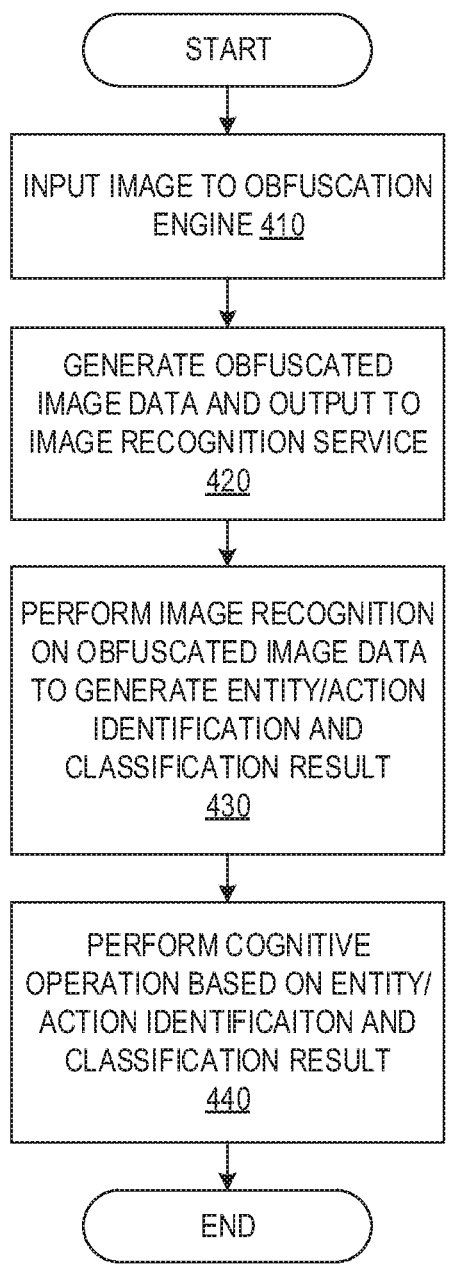
FIG. 4 is a flowchart outlining an example operation for performing image recognition in accordance with one illustrative embodiment.

FIG. 4 is a flowchart outlining an example operation for performing image recognition in accordance with one illustrative embodiment. As shown in FIG. 4, the operation starts by inputting an image to the obfuscation engine (step 410). The obfuscation engine generates obfuscated image data and outputs the obfuscated image data to the image recognition service (step 420). The image recognition service performs image recognition on the obfuscated image data to identify and classify entities/actions in the image (step 430). The cognitive system may then perform a cognitive operation, e.g., generate an alert, send a notification, log an event, or the like, based on the identification and classification of entities/actions by the image recognition services based on the obfuscated image data (step 440). The operation then terminates.

Thus, the illustrative embodiments provide mechanisms for determining a privacy protection layer or level, i.e. an amount of obfuscation, of input images that permits protecting the identity of entities present in images while still providing sufficient image content to allow image recognition services and corresponding cognitive operations to be performed. The illustrative embodiments utilize an adversarial network based framework to determine this privacy protection layer or level. In this way, image data that is transmitted to remote image recognition services may be obfuscated before being transmitted and thus, an interloper or attacker attempting to obtain the identity of entities present in captured image data is not able to discern the specific identities of the entities due to the obfuscation. However, the image data still maintains sufficient content that the image recognition services may identify types of entities and types of actions/motions present in the obfuscated image data such that cognitive operations may be performed based on such identification and classification of entities/actions.

It should be appreciated, as touched upon above, that while the above embodiments assume that a single approach to obfuscation is implemented by the obfuscation engine (generator), the illustrative embodiments are not limited to such. To the contrary, the obfuscation engine may utilized various algorithms or technologies for obfuscation of image data. In some embodiments, if it is determined that a particular obfuscation algorithm or technology does not provide sufficient obfuscation while allowing sufficient image content for image recognition service operations, then the obfuscation engine may select a different obfuscation algorithm or technology and attempt to achieve a desired privacy protection layer or level while allowing operation of the image recognition services with sufficient accuracy.

Figure 5:
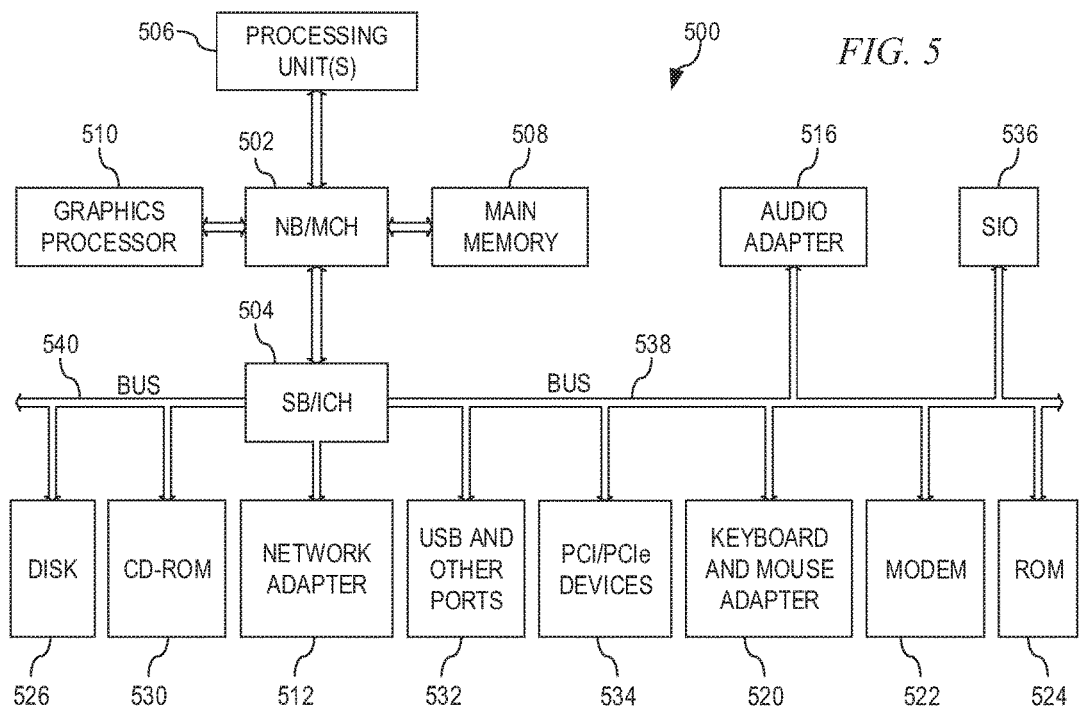
FIG. 5 is a block diagram of an example data processing system in which aspects of the illustrative embodiments are implemented.

As noted above, the mechanisms of the illustrative embodiments are rooted in the computer technology arts and are implemented using logic present in such computing or data processing systems. These computing or data processing systems are specifically configured, either through hardware, software, or a combination of hardware and software, to implement the various operations described above. As such, FIG. 5 is provided as an example of one type of data processing system in which aspects of the present invention may be implemented. Many other types of data processing systems may be likewise configured to specifically implement the mechanisms of the illustrative embodiments.

FIG. 5 is a block diagram of an example data processing system in which aspects of the illustrative embodiments are implemented. Data processing system 500 is an example of a computer, such as server 104 or client 110 in FIG. 1, in which computer usable code or instructions implementing the processes for illustrative embodiments of the present invention are located. In one illustrative embodiment, FIG. 5 represents a server computing device, such as a server 104, which, which implements a cognitive system 100 and QA system pipeline 108 augmented to include the additional mechanisms of the illustrative embodiments described hereafter.

In the depicted example, data processing system 500 employs a hub architecture including north bridge and memory controller hub (NB/MCH) 502 and south bridge and input/output (I/O) controller hub (SB/ICH) 504. Processing unit 506, main memory 508, and graphics processor 510 are connected to NB/MCH 502. Graphics processor 510 is connected to NB/MCH 502 through an accelerated graphics port (AGP).

In the depicted example, local area network (LAN) adapter 512 connects to SB/ICH 504. Audio adapter 516, keyboard and mouse adapter 520, modem 522, read only memory (ROM) 524, hard disk drive (HDD) 526, CD-ROM drive 530, universal serial bus (USB) ports and other communication ports 532, and PCI/PCIe devices 534 connect to SB/ICH 504 through bus 538 and bus 540. PCI/PCIe devices may include, for example, Ethernet adapters, add-in cards, and PC cards for notebook computers. PCI uses a card bus controller, while PCIe does not. ROM 524 may be, for example, a flash basic input/output system (BIOS).

HDD 526 and CD-ROM drive 530 connect to SB/ICH 504 through bus 540. HDD 526 and CD-ROM drive 530 may use, for example, an integrated drive electronics (IDE) or serial advanced technology attachment (SATA) interface. Super I/O (SIO) device 536 is connected to SB/ICH 504.

An operating system runs on processing unit 506. The operating system coordinates and provides control of various components within the data processing system 500 in FIG. 5. As a client, the operating system is a commercially available operating system such as Microsoft® Windows 10®. An object-oriented programming system, such as the Java™ programming system, may run in conjunction with the operating system and provides calls to the operating system from Java™ programs or applications executing on data processing system 500.

As a server, data processing system 500 may be, for example, an IBM® eServer™ System p® computer system, running the Advanced Interactive Executive (AIX®) operating system or the LINUX® operating system. Data processing system 500 may be a symmetric multiprocessor (SMP) system including a plurality of processors in processing unit 506. Alternatively, a single processor system may be employed.

Instructions for the operating system, the object-oriented programming system, and applications or programs are located on storage devices, such as HDD 526, and are loaded into main memory 508 for execution by processing unit 506. The processes for illustrative embodiments of the present invention are performed by processing unit 506 using computer usable program code, which is located in a memory such as, for example, main memory 508, ROM 524, or in one or more peripheral devices 526 and 530, for example.

A bus system, such as bus 538 or bus 540 as shown in FIG. 5, is comprised of one or more buses. Of course, the bus system may be implemented using any type of communication fabric or architecture that provides for a transfer of data between different components or devices attached to the fabric or architecture. A communication unit, such as modem 522 or network adapter 512 of FIG. 5, includes one or more devices used to transmit and receive data. A memory may be, for example, main memory 508, ROM 524, or a cache such as found in NB/MCH 502 in FIG. 5.

Those of ordinary skill in the art will appreciate that the hardware depicted in FIGS. 1 and 5 may vary depending on the implementation. Other internal hardware or peripheral devices, such as flash memory, equivalent non-volatile memory, or optical disk drives and the like, may be used in addition to or in place of the hardware depicted in FIGS. 1 and 5. Also, the processes of the illustrative embodiments may be applied to a multiprocessor data processing system, other than the SMP system mentioned previously, without departing from the spirit and scope of the present invention.

Moreover, the data processing system 500 may take the form of any of a number of different data processing systems including client computing devices, server computing devices, a tablet computer, laptop computer, telephone or other communication device, a personal digital assistant (PDA), or the like. In some illustrative examples, data processing system 500 may be a portable computing device that is configured with flash memory to provide non-volatile memory for storing operating system files and/or user-generated data, for example. Essentially, data processing system 500 may be any known or later developed data processing system without architectural limitation.

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication based network adapters may also be utilized including, but not limited to, 802.11a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system comprising at least one processor and at least one memory, the at least one memory comprising instructions which are executed by the at least one processor to configure the at least one processor to implement an adversarial network framework, the method comprising:

training, by the data processing system, using an adversarial training technique, an image obfuscation engine operating as a generator in the adversarial network framework, wherein the training trains the image obfuscation engine to determine a privacy protection layer to be applied by the image obfuscation engine to input image data;

applying, by the image obfuscation engine executing in the data processing system, the determined privacy protection layer to an input image captured by an image capture device associated with the data processing system to generate obfuscated image data; and transmitting, by the data processing system, the obfuscated image data to a remotely located image recognition service, via at least one data network, for performance of image recognition operations, wherein training the image obfuscation engine comprises modifying at least one operational parameter of the image obfuscation engine, based on outputs generated by a discriminator engine of the adversarial network framework in response to obfuscated training image data generated by the image obfuscation engine in response to input of training image data, to increase a loss achieved by the image obfuscation engine while improving or maintaining an accuracy in an output of the image recognition operations performed by the remotely located image recognition service.

2. The method of claim 1, wherein, during training of the image obfuscation engine, the image obfuscation engine operates as a generator of the adversarial network framework by processing input training image data to generate obfuscated training image data and a discriminator of the adversarial network framework attempts to discriminate the input training image data from the obfuscated training image data, and wherein the image obfuscation engine operating as the generator, and the discriminator, are separate computer neural networks operating adversarial to each other in the adversarial network framework.

3. The method of claim 2, wherein training the image obfuscation engine comprises:
determining a degree to which the discriminator is able to discriminate the input training image data from the obfuscated training image data; and
modifying at least one operational parameter of the image obfuscation engine based on the determined degree to which the discriminator is able to discriminate the input training image data from the obfuscated training image data.

4. The method of claim 1, wherein training the image obfuscation engine further comprises selecting an obfuscation mechanism, from a plurality of obfuscation mechanisms usable by the image obfuscation engine, that provides a highest loss of the image obfuscation, while obtaining a highest accuracy in the output of the image recognition operations, compared to other obfuscation mechanisms in the plurality of obfuscation mechanisms.

5. The method of claim 1, wherein, during training of the image obfuscation engine, the image obfuscation engine operates as an encoder that encodes an obfuscated version of input training image data, and a decoder of the adversarial network framework attempts to recreate the input training image data from the obfuscated version of the input training image data.

6. The method of claim 2, wherein training the image obfuscation engine comprises:
inputting label data generated by the discriminator, and metadata associated with the input image to a comparator;
determining, by the comparator, a degree of matching of the metadata associated with the input image to the label data generated by the discriminator; and
modifying, by the data processing system, operational parameters of the image obfuscation engine based on the degree of matching.

7. The method of claim 2, wherein training the image obfuscation engine comprises:

inputting a recreated image generated by the discriminator, and the input to a comparator;
determining, by the comparator, a degree of matching of the recreated image to the input image; and
modifying, by the data processing system, operational parameters of the image obfuscation engine based on the degree of matching.

8. The method of claim 6, wherein training the image obfuscation engine further comprises:
inputting an image recognition service output to the comparator, wherein the image recognition service output comprises identification and classification information for at least one of entities or actions present in the obfuscated image data;
determining, by the comparator, a measure of accuracy of the image recognition service output based on the metadata associated with the input image, wherein the metadata specifies at least one of actual entities or actions present in the input image; and
modifying the operational parameters of the image obfuscation engine based on the measure of accuracy.

9. The method of claim 1, further comprising:
performing, by the cognitive system, a cognitive operation based on the obfuscated image data, wherein the cognitive operation comprises cognitively identifying and classifying entities or actions in contents of the input image into at least one class of a plurality of classes based on results of the identifying and classifying of the entities or actions; and
performing at least one of sending a notification, transmitting an alert, or logging data indicating the identified entities or actions in the contents of the input image, based on one or more of the entities or actions being classified into a predetermined class for which the notification, alert, or logging is to be performed.

10. A computer program product comprising a computer readable storage medium having a computer readable program stored therein, wherein the computer readable program, when executed on a computing device, configures the computing device to implement an adversarial network framework, that operates to:
train, using an adversarial training technique, an image obfuscation engine operating as a generator in the adversarial network framework, wherein the training trains the image obfuscation engine to determine a privacy protection layer to be applied by the image obfuscation engine to input image data;
apply, by the image obfuscation engine, the determined privacy protection layer to an input image captured by an image capture device associated with the data processing system to generate obfuscated image data; and
transmit the obfuscated image data to a remotely located image recognition service, via at least one data network, for performance of image recognition operations, wherein training the image obfuscation engine comprises modifying at least one operational parameter of the image obfuscation engine, based on outputs generated by a discriminator engine of the adversarial network framework in response to obfuscated training image data generated by the image obfuscation engine in response to input of training image data, to increase a loss achieved by the image obfuscation engine while improving or maintaining an accuracy in an output of the image recognition operations performed by the remotely located image recognition service.

11. The computer program product of claim 10, wherein, during training of the image obfuscation engine, the image obfuscation engine operates as a generator of the adversarial network framework by processing input training image data to generate obfuscated training image data and a discriminator of the adversarial network framework attempts to discriminate the input training image data from the obfuscated training image data, and wherein the image obfuscation engine operating as the generator, and the discriminator, are separate computer neural networks operating adversarial to each other in the adversarial network framework.

12. The computer program product of claim 11, wherein the computer readable program further causes the adversarial network framework to train the image obfuscation engine at least by:
    determining a degree to which the discriminator is able to discriminate the input training image data from the obfuscated training image data; and
    modifying at least one operational parameter of the image obfuscation engine based on the determined degree to which the discriminator is able to discriminate the input training image data from the obfuscated training image data.

13. The computer program product of claim 10, wherein the computer readable program further causes the adversarial network framework to train the image obfuscation engine further at least by selecting an obfuscation mechanism, from a plurality of obfuscation mechanisms usable by the image obfuscation engine, that provides a highest loss of the image obfuscation, while obtaining a highest accuracy in the output of the image recognition operations, compared to other obfuscation mechanisms in the plurality of obfuscation mechanisms.

14. The computer program product of claim 10, wherein, during training of the image obfuscation engine, the image obfuscation engine operates as an encoder that encodes an obfuscated version of input training image data, and a decoder of the adversarial network framework attempts to recreate the input training image data from the obfuscated version of the input training image data.

15. The computer program product of claim 11, wherein the computer readable program further causes the adversarial network framework to tram the image obfuscation engine at least by:
    inputting label data generated by the discriminator, and metadata associated with the input image to a comparator;
    determining, by the comparator, a degree of matching of the metadata associated with the input image to the label data generated by the discriminator; and
    modifying, by the data processing system, operational parameters of the image obfuscation engine based on the degree of matching.

16. The computer program product of claim 11, wherein the computer readable program further causes the adversarial network framework to train the image obfuscation engine at least by:
    inputting a recreated image generated by the discriminator, and the input image, to a comparator;
    determining, by the comparator, a degree of matching of the recreated image to the input image; and
    modifying, by the data processing system, operational parameters of the image obfuscation engine based on the degree of matching.

17. The computer program product of claim 15, wherein the computer readable program further causes the adversarial network framework to train the image obfuscation engine at least by:
    inputting an image recognition service output to the comparator, wherein the image recognition service output comprises identification and classification information for at least one of entities or actions present in the obfuscated image data;
    determining, by the comparator, a measure of accuracy of the image recognition service output based on the metadata associated with the input image, wherein the metadata specifies at least one of actual entities or actions present in the input image; and
    modifying the operational parameters of the image obfuscation engine based on the measure of accuracy.

18. An apparatus comprising:
    a processor; and
    a memory coupled to the processor, wherein the memory comprises instructions which, when executed by the processor, configure the processor to implement an adversarial network framework, that operates to:
    train, using an adversarial training technique, an image obfuscation engine operating as a generator in the adversarial network framework, wherein the training trains the image obfuscation engine to determine a privacy protection layer to be applied by the image obfuscation engine to input image data;
    apply, by the image obfuscation engine, the determined privacy protection layer to an input image captured by an image capture device associated with the data processing system to generate obfuscated image data; and
    transmit the obfuscated image data to a remotely located image recognition service, via at least one data network, for performance of image recognition operations, wherein training the image obfuscation engine comprises modifying at least one operational parameter of the image obfuscation engine, based on outputs generated by a discriminator engine of the adversarial network framework in response to obfuscated training image data generated by the image obfuscation engine in response to input of training image data, to increase a loss achieved by the image obfuscation engine while improving or maintaining an accuracy in an output of the image recognition operations performed by the remotely located image recognition service.

19. The method of claim 1, wherein the adversarial network framework further comprises a comparator, and wherein during training of the image obfuscation engine:
    the comparator receives, as input, training image data, an output from the discriminator engine, and an output from the remotely located image recognition service based on execution of the image recognition operations on an obfuscated version of the training image data generated by the image obfuscation engine,
    the comparator generates a degree of matching between the output from the discriminator engine and the training image data, and a measure of accuracy of the output from the remotely located image recognition service, and
    the data processing system modifies the at least one operational parameter of the image obfuscation engine based on both the degree of matching and the measure of accuracy.

* * * * *